United States Patent
Rogers et al.

(10) Patent No.: US 12,282,209 B1
(45) Date of Patent: Apr. 22, 2025

(54) CONTACT LENS AND PACKAGING SOLUTION

(71) Applicant: CooperVision International Limited, Fareham (GB)

(72) Inventors: Victoria Rogers, Pleasanton, CA (US); Dharmendra Jani, Livermore, CA (US); Camille Regan, Livermore, CA (US)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 0 days.

(21) Appl. No.: 18/880,282

(22) PCT Filed: May 30, 2024

(86) PCT No.: PCT/GB2024/051381
§ 371 (c)(1),
(2) Date: Dec. 31, 2024

(87) PCT Pub. No.: WO2024/246515
PCT Pub. Date: Dec. 5, 2024

Related U.S. Application Data

(60) Provisional application No. 63/469,874, filed on May 31, 2023.

(51) Int. Cl.
*G02C 7/04* (2006.01)

(52) U.S. Cl.
CPC ...................... *G02C 7/04* (2013.01)

(58) Field of Classification Search
CPC ....................................... G02C 7/04
USPC ..................................... 351/159.02
See application file for complete search history.

(56) References Cited

U.S. PATENT DOCUMENTS

| | | | |
|---|---|---|---|
| 5,275,810 A | 1/1994 | Dupuis et al. | |
| 5,882,687 A * | 3/1999 | Park | A61L 12/08 514/2.3 |
| 10,449,740 B2 * | 10/2019 | Qian | B29D 11/00144 |
| 10,830,923 B2 * | 11/2020 | Qiu | B29D 11/00865 |
| 11,002,884 B2 * | 5/2021 | Zhang | C08J 7/08 |
| 11,029,446 B2 * | 6/2021 | Qiu | C08L 33/02 |
| 11,029,447 B2 * | 6/2021 | Qiu | G02C 7/049 |
| 2009/0057164 A1 | 3/2009 | Minick et al. | |
| 2009/0182068 A1 * | 7/2009 | Liu | G02B 1/043 523/108 |
| 2010/0243483 A1 * | 9/2010 | Matsuzawa | A61L 12/04 206/5.1 |
| 2014/0237945 A1 * | 8/2014 | Minick | G02B 1/043 53/428 |
| 2018/0081197 A1 * | 3/2018 | Qiu | G02B 1/043 |
| 2018/0105620 A1 * | 4/2018 | Chang | C08F 8/48 |
| 2019/0023891 A1 * | 1/2019 | Chang | G02C 7/04 |
| 2020/0174160 A1 * | 6/2020 | Qiu | C09D 143/02 |
| 2020/0199269 A1 * | 6/2020 | Chang | C08F 24/00 |
| 2022/0105230 A1 | 4/2022 | Awasthi et al. | |
| 2022/0299796 A1 * | 9/2022 | Qiu | G02C 7/04 |

FOREIGN PATENT DOCUMENTS

JP 2014222362 A 11/2024

OTHER PUBLICATIONS

International Search Report and Written Opinion issued in corresponding International Patent Application No. PCT/GB2024/051381 dated Oct. 16, 2024 (12 pages).

* cited by examiner

*Primary Examiner* — William R Alexander
(74) *Attorney, Agent, or Firm* — Kilyk & Bowersox, P.L.L.C.

(57) ABSTRACT

An unworn sterile contact lens immersed in a packaging solution and sealed in a container is described as well as an ophthalmically-acceptable packaging solution for contact lenses is described that comprises a poly(2-alkyl-oxazoline) and an acrylates/C10-30 alkyl acrylate crosspolymer. The packaging solution has excellent lubricity, is optically clear, and has a high viscosity that facilitates increased carry over of the packaging solution when the contact lens is removed from its package.

16 Claims, No Drawings

CONTACT LENS AND PACKAGING SOLUTION

This application is a National Stage Application of PCT/GB2024/051381, filed May 30, 2024, which claims priority to U.S. Provisional Patent Application No. 63/469,874, May 31, 2023.

FIELD OF THE INVENTION

The field of the invention relates to contact lenses in a packaging solution for the storage of the contact lenses.

BACKGROUND

An estimated 50% of all contact lens wearers experience discomfort while wearing their lenses, and approximately 25% of contact lens wearers permanently discontinue wearing lenses. One type of discomfort is initial discomfort immediately after lens insertion. Eyes can also become dry and uncomfortable after the lens has been worn for a while. There is a desire to provide a packaging solution for contact lenses that improves the comfort of contact lenses both upon initial insertion and during wear.

When a new contact lens is removed from its packaging, a small volume of the packaging solution remains on the lens as "carry over". A packaging solution that provides increased carry over may improve the comfort of the lens. A packaging solution that also improves the lubricity and/or smoothness of the lens to touch would also be advantageous.

SUMMARY

A feature of the present invention is to provide an unworn sterile contact lens immersed in a packaging solution and sealed in a container, wherein the packaging solution provides one or more advantages such as one or more advantages to the contact lens.

An additional feature of the present invention is to provide a packaging solution for the storage of contact lenses, such as hydrogel (e.g. silicone hydrogel) contact lenses that can increase the insertion comfort of the contact lenses.

A further feature of the present invention is to provide a packaging solution for the storage of contact lenses that provides increased packaging solution carry over when the lens is removed from its container.

A further feature of the present invention is to provide a packaging solution for the storage of contact lenses that improves the lubricity and/or smoothness of the contact lens to the touch.

A further feature of the present invention is to provide a packaging solution that reduces the contact angle of a contact lens.

A further feature of the present invention is to provide a packaging solution that results in a lower contact angle of a contact lens, even after rinsing.

A further feature of the present invention is to provide a packaging solution for the storage of contact lenses that provides the above features without adversely affecting the optical clarity of the lens.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention, in part, relates to an unworn sterile contact lens immersed in a packaging solution and sealed in a container, wherein the packaging solution has a viscosity of 2.0 to 8.0 cP and comprises (i) a poly(2-oxazoline) and (ii) an acrylates/C10-30 alkyl acrylate crosspolymer (as defined below).

The present invention further relates to a method of manufacturing a contact lens comprising: (a) curing a polymerizable composition to form a polymeric lens body, (b) placing the polymeric lens body and a packaging solution in a container, wherein the packaging solution comprises a poly(2-oxazoline) and a crosslinked copolymer of a first monomer selected from one or more monomers of acrylic acid and methacrylic acid and a second monomer selected from one or more C10-30 alkyl acrylate esters of acrylic acid or methacrylic acid, (c) sealing the container, and (d) heat sterilizing the sealed container to provide a sterilely packaged contact lens.

It is to be understood that both the foregoing general description and the following detailed description are exemplary and explanatory only and are intended to provide a further explanation of the present invention, as claimed.

DETAILED DESCRIPTION

The present invention, in part, relates to an unworn sterile contact lens immersed in a packaging solution and sealed in a container, wherein the packaging solution comprises (i) a poly(2-oxazoline) and (ii) an acrylates/C10-30 alkyl acrylate crosspolymer (as defined below). The preferred contact lens, namely, a hydrogel (e.g., silicone hydrogel) contact lens is discussed hereafter, but it is to be understood that the present invention can be applicable to other contact lens types. The contact lens is provided unworn (i.e., it is a new contact lens, not having been previously used by a patient).

The poly(2-oxazoline) is preferably a poly(2-alkyl-2-oxazoline). Exemplary poly(2-alkyl-2-oxazoline)s include poly(2-methyl-2-oxazoline), poly(2-ethyl-2-oxazoline), poly(2-n-propyl-2-oxazoline), poly(2-cyclopropyl-2-oxazoline), poly(2-isopropyl-2-oxazoline) and poly(2-sec-butyl-2-oxazoline). The alkyl part of the poly(2-alkyl-2-oxazoline) can be linear. The alkyl part of the poly(2-alkyl-2-oxazoline) can be branched. The alkyl part can be a C1 to C10 alkyl, such as a C1 to C6 alkyl or a C1 to C4 alkyl (e.g., C1, C2, C3, C4, C5, C6, C7, C8, C9, or C10 alkyl). Particularly preferred poly(2-alkyl-2-oxazoline)s include poly(2-ethyl-2-oxazoline), poly-(2-methyl-2-oxazoline), and poly(2-cyclopropyl-2-oxazoline).

Suitable poly(2-oxazoline)s typically have an average molecular weight of 2 kDa to 2,000 kDa. Preferably, the poly(2-oxazoline) has an average molecular weight of from about 10 kDa to about 1,000 kDa, or from about 50 kDa to about 750 kDa.

The poly(2-oxazoline) is present in the packaging solution in the amount of 0.1 wt. % to about 5.0 wt. %, preferably about 0.1 wt. % to about 2.0 wt. %, more preferably about 0.25 wt. % to about 1.5 wt. %, and most preferably about 0.5 wt. % to about 1.0 wt. % based on the total weight of the packaging solution.

The packaging solution comprises a crosslinked copolymer comprising units derived from a first monomer selected from one or more monomers of acrylic acid and methacrylic acid and a second monomer selected from one or more C10-30 alkyl acrylate esters of acrylic acid or methacrylic acid. The crosslinked copolymer may optionally comprise units derived from simple esters of the first monomer. Such crosslinked polymers are referred to in the cosmetics industry as "acrylates/C10-30 alkyl acrylate crosspolymers" under INCI nomenclature, and for convenience the same terminology is used herein. Preferred acrylates/C10-30 alkyl acrylate crosspolymers are cross-linked block copolymers having emulsifying properties comprising hydrophilic blocks of the first monomer and hydrophobic blocks of the second monomer cross-linked with an allyl (2-propenyl) ether of sucrose or an allyl ether of pentaerythritol. Preferred acrylates/C10-30 alkyl acrylate crosspolymers are commercially available under the trade names Carbopol® 1342 and 1382, Carbopol® Ultrez 20 and 21, Carbopol® ETD 2020, and Pemulen® TR-1 and TR-2 from Lubrizol Advanced Materials, Inc. Suitable polymers and methods of manufacturing acrylates/C10-30 alkyl acrylate crosspolymers are described in U.S. Pat. No. 5,288,814.

The acrylates/C10-30 alkyl acrylate crosspolymer is present in the packaging solution in amounts of from about 0.01 wt. % to about 1.0 wt. %, preferably about 0.01 wt. % to about 0.5 wt. %, more preferably from about 0.01 wt. % to about 0.2 wt. % or from about 0.02 wt. % to about 0.1 wt. %, and most preferably from about 0.03 wt. % to about 0.08 wt. %, based on the total weight of the packaging solution.

The acrylates/C10-30 alkyl acrylate crosspolymer may have a viscosity at 1.0 wt. % in an organic solvent at pH 7.5 (e.g., a 50:50 cyclohexane and ethyl acetate cosolvent system at pH 7.5) ranging from about 1,000 to about 100,000 cP, or from about 2,000 to about 50,000 cP, or from about 4,000 to about 40,000 cP. Unless indicated otherwise, viscosity values herein are dynamic viscosity values determined at 25° C. (1 atm) and shear rate=10 [1/s], for example, using a Physica MCR 301 model rheometer from Anton Paar. 1 cP=1 mPa·s, In a specific example, the acrylates/C10-30 alkyl acrylate crosspolymer comprises a copolymer of acrylic acid and C10-C30 alkyl acrylates crosslinked with allyl pentaerythritol. In one example, such acrylates/C10-30 alkyl acrylate crosspolymer has a viscosity of about 4,000 to about 30,000 cP at concentration of 1.0 wt. % in a cyclohexane and ethyl acetate cosolvent system. Pemulen® TR-1 and TR-2 are examples of such copolymers.

The packaging solution has an ophthalmically-acceptable pH and osmolarity. An ophthalmically acceptable pH is in the range of about 6.8 or 7.0 up to about 7.8 or 8.0. An ophthalmically-acceptable osmolarity is in the range of about 200 to 400 mOsm/kg, and typically from about 270 mOsm/kg up to about 330 mOsm/kg. In one example, the packaging solution comprises phosphate buffer or borate buffer. In another example, the packaging solution comprises a tonicity agent selected from sodium chloride or sorbitol in an amount to maintain an ophthalmically-acceptable osmolarity.

The packaging solution has a viscosity of about 2.0 cP or 2.5 cP up to about 7.5 cP or 8.0 cP, preferably from 2.5 cP to 7.5 cP, and more preferably from 3.0 cP to 6.5 cP. The combination of an acrylates/C10-30 alkyl acrylate crosspolymer with a poly(2-oxazoline) surprisingly results in a synergistic increase in the viscosity of the packaging solution. In other words, the viscosity of the packaging solution comprising both an acrylates/C10-30 alkyl acrylate crosspolymer and a poly(2-oxazoline) is higher than both 1) a packaging solution that lacks the poly(2-oxazoline) but is otherwise identical (i.e. an "acrylates/C10-30 alkyl acrylate crosspolymer control packaging solution", and 2) a packaging solution that lacks the acrylates/C10-30 alkyl acrylate crosspolymer but is otherwise identical (i.e. a "poly(2-oxazoline) control packaging solution"). In one example, the viscosity of the packaging solution is at least 0.25 cP higher than both the viscosity of the poly(2-oxazoline) control solution and the viscosity of the acrylates/C10-30 alkyl acrylate crosspolymer control solution. Preferably the packaging solution has a viscosity that is at least 0.5 cP, or 1.0 cP, 1.5 cP, or 2.0 cP higher than either control solution (e.g., 0.25 cP to 3 cP higher).

The packaging solution has an average % light transmission (% T) across 400 nm to 600 nm of at least 98%, as determined using a Perkin Elmer Lambda 35 UV/Vis Spectrophotometer or equivalent method. Surprisingly, the addition of a poly(2-oxazoline) to a packaging solution comprising acrylates/C10-30 alkyl acrylate crosspolymer can increase the visual clarity of the solution. In a particular example, the packaging solution comprising both an acrylates/C10-30 alkyl acrylate crosspolymer and a poly(2-oxazoline) has an average % T across 400 nm to 600 nm that is at least 1.0% higher than a packaging solution that lacks the poly(2-oxazoline) but is otherwise identical. In other words, if an alkyl acrylate crosspolymer control solution has an average % T across 400 nm to 600 nm of 97.2, the addition of poly(2-oxazoline) to the solution will increase the average % T of the solution to at least 98.2. The average % T across 400 nm to 600 nm can be from 0.5% higher to 10% higher than a packaging solution that lacks the poly (2-oxazoline) but is otherwise identical.

The packaged contact lens of the invention when removed from its container has a reduced contact angle compared to a contact lens of the same material packaged in a packaging solution that has no poly(2-oxazoline) or acrylates/C10-30 alkyl acrylate crosspolymer but is otherwise identical (i.e., a control lens). Unless indicated otherwise, references herein to contact angle refers to the sessile drop contact angle measured using a KRUSS DSA 100 drop shape analysis system (or equivalent) and the method described in Example 4 below (or equivalent). In one example, the packaged contact lens of the invention has a contact angle upon removal from its container that is at least 10%, 20%, 25%, 30%, 40% or 50% lower than the contact angle of a control lens. The packaged contact lens of the invention may have less than a 50% increase in contact angle after rinsing in PBS using the method described in Example 4 below (hereinafter "a PBS rinse"). In some examples, the contact lens of the invention may have less than a 40% or 30% increase in contact angle after a PBS rinse.

The packaging solution may optionally contain additional ingredients such as a comfort agent, a hydrophilic polymer, a surfactant or other additive that prevents the lens from sticking to the container, etc. In one example, the packaging solution comprises a non-ionic surfactant. In a specific example, the packaging solution comprises a poloxamer, such as poloxamer 407 (CAS No. 691397-13-4) in an amount of from about 0.005 wt. % to about 0.05 wt. % based on the total weight of the packaging solution.

The contact lens of the invention may comprise any material suitable for use as a contact lens material. Preferably, the contact lens is made from a silicone hydrogel material or a non-silicone hydrogel material. The packaging solution of the invention improves the lubricity of a wide range of contact lens materials made from silicone hydrogels and non-silicone hydrogels, as demonstrated by Example 3 below.

In a specific example, the contact lens of the packaging system comprises a silicone hydrogel material. Silicone hydrogel contact lenses are typically formed by curing a polymerizable composition (i.e., a monomer mixture) comprising at least one siloxane monomer and at least one hydrophilic monomer or at least one hydrophilic polymer, or a combination thereof. As used herein, the term "siloxane monomer" is a molecule that contains at least one Si—O group and at least one polymerizable group. Siloxane monomers used in contact lens compositions are well-known in the art (see, e.g., U.S. Pat. Nos. 8,658,747 and 6,867,245). All patents and publications mentioned here and throughout are incorporated in their entirety by reference. In some examples, the polymerizable composition comprises a total amount of siloxane monomer of at least 10 wt. %, 20 wt. %, or 30 wt. % up to about 40 wt. %, 50 wt. %, 60 wt. %, or 70 wt. %. Unless specified otherwise, as used herein, a given weight percentage (wt. %) of a component of the polymerizable composition is relative to the total weight of all polymerizable ingredients and IPN polymers (as described further below) in the polymerizable composition. The weight of the polymerizable composition contributed by components, such as diluents, that do not incorporate into the final contact lens product are not included in the wt. % calculation.

In a specific example, the polymerizable composition comprises a hydrophilic vinyl monomer. As used-herein, a "hydrophilic vinyl monomer" is any siloxane-free (i.e., contains no Si—O groups) hydrophilic monomer having a polymerizable carbon-carbon double bond (i.e., a vinyl group) present in its molecular structure that is not part of an acryl group, where the carbon-carbon double bond of the vinyl group is less reactive than the carbon-carbon double bond present in a polymerizable methacrylate group under free radical polymerization. As used herein, the term "acryl group" refers to the polymerizable group present in acrylate, methacrylates, acrylamides, etc. Thus, while carbon-carbon double bonds are present in acrylate and methacrylate groups, as used herein, such polymerizable groups are not considered to be vinyl groups. Further, as used herein, a monomer is "hydrophilic" if at least 50 grams of the monomer are fully soluble in 1 liter of water at 20° C. (i.e., ~5% soluble in water) as determined visibly using a standard shake flask method. In various examples, the hydrophilic vinyl monomer is N-vinyl-N-methylacetamide (VMA), or N-vinyl pyrrolidone (NVP), or 1,4-butanediol vinyl ether (BVE), or ethylene glycol vinyl ether (EGVE), or diethylene glycol vinyl ether (DEGVE), or any combination thereof. In one example, the polymerizable composition comprises at least 10 wt. %, 15 wt. %, 20 wt. %, or 25 wt. % up to about 45 wt. %, 60 wt. %, or 75 wt. % of a hydrophilic vinyl monomer. As used herein, a given weight percentage of a particular class of component (e.g., hydrophilic vinyl monomer, siloxane monomer, or the like) in the polymerizable composition equals the sum of the wt. % of each ingredient in the composition that falls within the class. Thus, for example, a polymerizable composition that comprises 5 wt. % BVE and 25 wt. % NVP and no other hydrophilic vinyl monomer, is said to comprise 30 wt. % hydrophilic vinyl monomer. In one example, the hydrophilic vinyl monomer is a vinyl amide monomer. Exemplary hydrophilic vinyl amide monomers are VMA and NVP. In a specific example, the polymerizable composition comprises at least 25 wt. % of a vinyl amide monomer. In a further specific example, the polymerizable composition comprises from about 25 wt. % up to about 75 wt. % of VMA or NVP, or a combination thereof. Additional hydrophilic monomers that may be included in the polymerizable composition are N,N-dimethylacrylamide (DMA), 2-hydroxyethyl methacrylate (HEMA), ethoxyethyl methacrylamide (EOEMA), ethylene glycol methyl ether methacrylate (EGMA), and combinations thereof.

In addition, or as an alternative to a hydrophilic monomer, the polymerizable composition may comprise a non-polymerizable hydrophilic polymer, which results in a polymeric lens body comprising an interpenetrating polymer network (IPN) with the non-polymerizable hydrophilic polymer interpenetrating the silicone hydrogel polymer matrix. In this example, the non-polymerizable hydrophilic polymer is referred to as an IPN polymer, which acts as an internal wetting agent in the contact lens. In contrast, polymer chains within the silicone hydrogel network that form by polymerization of monomers present in the polymerizable composition are not considered to be IPN polymers. The IPN polymer may be a high molecular weight hydrophilic polymer, for example from about 50,000 to about 500,000 Daltons. In a specific example, the IPN polymer is polyvinylpyrrolidone (PVP). In other examples, the polymerizable composition is substantially free of polyvinyl pyrrolidone or other IPN polymer.

As an option, one or more non-silicon containing hydrophobic monomers can be present as part of the polymerizable composition. A hydrophobic monomer can be understood to be any monomer for which 50 grams of the monomer are not visibly fully soluble in 1 liter of water at 20° C. using a standard shake flask method. Examples of suitable hydrophobic monomers include methyl acrylate, or ethyl acrylate, or propyl acrylate, or isopropyl acrylate, or cyclohexyl acrylate, or 2-ethylhexyl acrylate, or methyl methacrylate (MMA), or ethyl methacrylate, or propylmethacrylate, or butyl acrylate, or 2-hydroxybutyl methacrylate, or vinyl acetate, or vinyl propionate, or vinyl butyrate, or vinyl valerate, or styrene, or chloroprene, or vinyl chloride, or vinylidene chloride, or acrylonitrile, or 1-butene, or butadiene, or methacrylonitrile, or vinyltoluene, or vinyl ethyl ether, or perfluorohexylethylthiocarbonylaminoethyl methacrylate, or isobornyl methacrylate (IBM), or trifluoroethyl methacrylate, or hexafluoroisopropyl methacrylate, or tetrafluoropropyl methacrylate, or hexafluorobutyl methacrylate, or any combinations thereof.

The hydrophobic monomer, if used, can be present in the reaction product of the polymerizable composition in amounts of from 1 wt. % to about 30 wt. %, such as from 1 wt. % to 25 wt. %, from 1 wt. % to 20 wt. %, from 1 wt. % to 15 wt. %, from 2 wt. % to 20 wt. %, from 3 wt. % to 20 wt. %, from 5 wt. % to 20 wt. %, from 5 wt. % to 15 wt. %, from 1 wt. % to 10 wt. %, based on the total weight of the polymerizable composition.

As will be appreciated by those skilled in the art, the polymerizable composition may comprise additional polymerizable or non-polymerizable ingredients conventionally used in contact lens formulations such as one or more of a polymerization initiator, a UV absorbing agent, a tinting agent, an oxygen scavenger, a chain transfer agent, or the like. In some examples, the polymerizable composition may include an organic diluent in an amount to prevent or minimize phase separation between the hydrophilic and hydrophobic components of the polymerizable composition, so that an optically clear lens is obtained. Diluents commonly used in contact lens formulations include hexanol, ethanol, and/or other alcohols. In other examples, the polymerizable composition is free or substantially free (e.g., less than 500 ppm) of an organic diluent. In such examples, the use of siloxane monomers containing hydrophilic moieties such as polyethylene oxide groups, pendant hydroxyl groups, or other hydrophilic groups, may make it unnecessary to include a diluent in the polymerizable composition. Non-limiting examples of these and additional ingredients that may be included in the polymerizable composition are provided in U.S. Pat. No. 8,231,218.

Non-limiting examples of silicone hydrogels that may be used include comfilcon A, fanfilcon A, stenfilcon A, senofilcon A, senofilcon C. somofilcon A, narafilcon A, delefilcon A, narafilcon A, lotrafilcon A, lotrafilcon B, balafilcon A, samfilcon A, galyfilcon A, and asmofilcon A.

A specific example of a contact lens of the present invention is a silicone hydrogel contact lens comprising a polymeric lens body that is the reaction product of a polymerizable composition comprising from 25 wt. % to 55 wt. % of a siloxane monomer or a combination of siloxane monomers, from 30 wt. % to 55 wt. % of a vinyl monomer selected from NVP, VMA, or combinations thereof, and optionally from about 1 wt. % to about 20 wt. % of a hydrophilic monomer selected from N,N-dimethylacrylamide (DMA), 2-hydroxyethyl methacrylate (HEMA), ethoxyethyl methacrylamide (EOEMA), or ethylene glycol methyl ether methacrylate (EGMA), or any combination thereof, and optionally from about 1 wt. % to about 20 wt. % of a hydrophobic monomer selected from methyl methacrylate (MMA), isobornyl methacrylate (IBM), or 2-hydroxybutyl methacrylate (HOB) or any combination thereof. Silicone hydrogel materials made from this specific embodiment of polymerizable composition include stenfilcon A, comfilcon A, somofilcon A, fanfilcon A, and enfilcon A.

Conventional methods can be used to manufacture the contact lens of the invention. As an example, a polymerizable composition for a silicone hydrogel composition is dispensed into a female mold member having a concave surface that defines the front surface of the contact lens. A male mold member having a convex surface that defines the back surface of the contact lens, i.e., the cornea-contacting surface, is combined with the female mold member to form a contact lens mold assembly that is subjected to curing conditions, such as UV or thermal curing conditions, under which the curable composition is formed into a polymeric lens body. The female and male mold members can be non-polar molds or polar molds. The mold assembly is disassembled (i.e., demolded) and the polymeric lens body is removed from the mold and contacted with a solvent, for instance, an organic solvent, such as ethanol, to extract unreacted components from the lens body. In some examples, an extraction liquid may comprise an organic solvent mixed with water. In other examples, the polymeric lens body may be extracted in an aqueous solution substantially free of organic solvents. After extraction, the lens body is hydrated in one or more hydration liquids such as water or an aqueous solution and packaged with the packaging solution of the invention. Exemplary methods of manufacturing silicone hydrogel contact lenses are described in U.S. Pat. No. 8,865,789.

The contact lens is immersed in the packaging solution and sealed in a container. The container can comprise a base member comprising a bowl that defines a blister cavity dimensioned to accommodate the contact lens and packaging solution and a flange projecting away from the blister cavity. The base member can be formed from any suitable material, such as glass or a thermoplastic material. A liquid-tight seal can be provided by a cover attached to the flange region, such as a removable foil that is glued or heat sealed to the flange region. Such contact lens containers (i.e. packages), which are commonly referred to as "blister packs", are well-known in the art (see e.g., U.S. Pat. No. 7,426,993). Generally, the container is configured to receive a single contact lens and an amount of packaging solution sufficient to completely cover the contact lens, typically about 0.5-1.5 ml.

The container can also be a "foil to foil package" which comprises two foil members bonded together, which may either be flat, or one or both foil members formed into an appropriate geometric shape to accommodate the lens and packaging solution. In another example, the container is in the form of a plastic base member comprising a plurality of threads and the cover comprises a plastic cap member comprising a compatible set of threads for engagement with the threads of the base member thereby providing a resealable cover. It will be appreciated that other types of containers can be used.

A method of manufacturing the packaged contact lens may comprise: (a) curing a polymerizable composition to form a polymeric lens body, (b) placing the polymeric lens body and a packaging solution in a container, wherein the packaging solution comprises a poly(2-oxazoline) and a crosslinked copolymer of a first monomer selected from one or more monomers of acrylic acid and methacrylic acid and a second monomer selected from one or more C10-30 alkyl acrylate esters of acrylic acid or methacrylic acid, (c) sealing the container, and (d) heat sterilizing the sealed container to provide a sterile packaged contact lens.

The following Examples illustrate certain aspects and advantages of the present invention, which should be understood not to be limited thereby.

Example 1

A phosphate buffered saline packaging solution was prepared by mixing together the ingredients and amounts shown in Table 1. This was used as a control packaging solution

TABLE 1

| Component | Wt. % |
| --- | --- |
| Sodium dihydrogen phosphate dihydrate | 0.071% |
| Sodium hydrogen phosphate dodecahydrate | 0.599% |
| Sodium Chloride | 0.830% |
| Poloxamer 407 | 0.020% |
| D.I. H$_2$O | 98.480% |

Numerous additives were tested to find one that can increase viscosity and improve lubricity of the control packaging solution while maintaining solution clarity. A subset of the polymer additives and amounts that were added to the control packaging solution are shown in Table 2. The viscosity of each packaging solution was measured at 25° C. at shear rate=10 [1/s] using a Physica MCR 301 model rheometer from Anton Paar. The clarity of the packaging solution was visually assessed.

Contact lenses were made by curing the polymerizable formulation for somofilcon A. Each cured lens was removed from a mold, hydrated with D.I. water, and placed in a blister package together with 1.2 mL of packaging solution. The packages were sealed and autoclaved.

The tactile feel of each lens was evaluated by removing the lens from its package placing the lens on the tip of the evaluator's index finger, rubbing the lens between the index finger and thumb for at least 20 seconds, and recording the lubricity compared to lenses packaged in the control packaging solution, where nd indicates no noticeable difference and +, ++, and +++ indicate slightly better, better and significantly better lubricity, respectively. Results are shown in Table 2.

TABLE 2

| Trade name | Chemical Description/ CAS# | Wt. % in packaging solution | Lubricity compared to control | Viscosity in cP | Clarity |
|---|---|---|---|---|---|
| Carbopol ETD 2020 | Acrylates/ C10-30 Alkyl Acrylate Crosspolymer/ CAS# 9007-20-9 | 0.1 | + | 4.1 | Hazy |
| Pemulen TR-2 | Acrylates/ C10-30 Alkyl Acrylate Crosspolymer/ CAS# 145687-02-1 | 0.01 | ++ | 1.09 | Minimally hazy |
|  |  | 0.03 | ++ | 1.37 | Slightly hazy |
|  |  | 0.05 | +++ | 2.15 | Slightly hazy |
|  |  | 0.07 | +++ | 2.64 | Slightly hazy |
| Pemulen TR-1 | Acrylates/ C10-30 Alkyl Acrylate Crosspolymer/ CAS# 138789-85-2 | 0.01 | ++ | 0.977 | Slightly hazy |
|  |  | 0.03 | ++ | 1.4 | Hazy |
|  |  | 0.05 | +++ | 1.48 | Hazy |
|  |  | 0.07 | +++ | 1.6 | Hazy |
|  | Poly(2-ethyl-2-oxazoline); average $M_W$ ~500,000/ CAS# 25805-17-8 | 1.0 | nd |  | Clear |
|  |  | 2.0 | + | 4.83 | Clear |

As indicated in Table 2, the addition of Pemulen (TR2 or TR1) significantly improved the lubricity of the Somofilcon A contact lenses compared to the control packaging solution even at very low concentrations (starting at 0.01%). However, the viscosity of the Pemulen solutions was relatively low. Further, the Pemulen-containing solutions were hazy, which could lead to phase separation over time.

Example 2

Various additives were tested to find one that could increase the viscosity and improve the clarity of the Pemulen-containing packaging solutions. Only a few of the additives tested resulted in both increased viscosity and improved clarity. Of these, poly(oxazoline) was selected as the best candidate for further evaluation.

Packaging solutions containing Pemulen TR-2 and poly(2-ethyl-2-oxazoline)(average $M_W$~500,000) at the concentrations shown in Table 3 were prepared. Briefly, Pemulen TR-2 was added to the control packaging solution of Example 1 at two times the final concentrations shown in Table 3, i.e., at 0.036 wt. %, 0.07 wt. %, 0.1 wt. %, 0.14 wt. %, or 0.2 wt. %. The Pemulen TR-2-containing solutions were filtered through 1.2 µm glass filters. Separately, poly(2-ethyl-2-oxazoline) was added to the control packaging solution of Example 1 at 0.5 wt. %, 1.0 wt. %, 1.6 wt. % or 2.0 wt. %, i.e., two times the final concentrations shown in Table 3. The poly(2-ethyl-2-oxazoline)-containing solutions were filtered through a 0.2 µm filter. The filtered solutions were then combined to result in the Pemulen TR-2 and polyoxazoline concentration combinations shown in Table 3 and stirred to equilibrate for at least 24 hours.

The viscosity of each packaging solution was measured before and after autoclave (ATC). Lubricity of post-autoclave somofilcon A lenses packaged with the packaging solution was assessed as described above. Results are shown in Table 3. All solutions had ophthalmically-acceptable osmolarity (between 310 to 325 mOsm/L) and pH (between 7.3 to 7.4). The packaging solutions did not affect lens shape (diameter and base curve).

TABLE 3

| Pemulen TR-2 Conc. (wt. %) | Polyoxazoline Conc. (wt. %) | Pre-ATC Viscosity (cP) | Post-ATC Viscosity (cP) | Lubricity |
|---|---|---|---|---|
| 0.07 | 1 | 6.79 | 7.91 | ++ |
| 0.07 | 0.8 | 5.74 | 5.83 | ++ |
| 0.07 | 0.5 | 4.08 | 3.55 | ++ |
| 0.1 | 0.5 | 6.89 | 6.51 | ++ |
| 0.05 | 0.5 | 3.04 | 4.12 | + |
| 0.035 | 0.5 | 2.35 | 2.78 | nd |
| 0.018 | 0.25 | 1.41 | 1.68 | nd |
| 0.05 | 0.25 | 2.12 | 2.35 | + |

Packaging solutions were made containing the control packaging solution of Example 1 with 0.05 wt. % Pemulen TR2, or 1 wt. % poly(2-ethyl-2-oxazoline) (pOx) (average $M_W$~500,000), or both 0.05 wt. % Pemulen TR2 and 1 wt. % pOX. Percent light transmittance (% T) of each solution (n=3) was measured pre- and post-autoclave at 400 nm, 500 nm, and 600 nm using an Evolution 300 UV-vis spectrophotometer from Thermo Scientific. The average % transmission (% T) and standard deviations (STD) are shown in Table 4. The results show that the addition of poly(oxazoline) reduces the haziness and increases the light transmission of a packaging solution that contains Pemulen.

TABLE 4

| Packaging Solution | Ave % T/(STD) Pre-Autoclave | | | Ave % T/(STD) Post-Autoclave | | |
|---|---|---|---|---|---|---|
|  | 400 nm | 500 nm | 600 nm | 400 nm | 500 nm | 600 nm |
| 1% pOX | 98.4 (0.1) | 99.6 (0.1) | 99.7 (0.1) | 98.3 (0.1) | 99.6 (0.1) | 99.8 (0.0) |
| 0.05% Pemulen TR2 + 1% pOX | 98.1 (0.01) | 99.5 (0.01) | 99.7 (0.01) | 97.7 (0.01) | 99.1 (0.01) | 99.4 (0.01) |
| 0.05% Pemulen TR2 | 91.1 (0.1) | 93.2 (0.1) | 94.3 (0.1) | 96.2 (0.5) | 97.3 (0.5) | 97.9 (0.4) |

Example 3

Experiments were carried to assess if the addition of polyoxazoline and a crosslinked copolymer of acrylic acid and a hydrophobic C10-30 alkyl acrylate to the packaging solution altered the lubricity of other hydrogel contact lenses.

Several commercially available contact lenses made from somofilcon A, comfilcon A, stenfilcon A, and omalfilcon A were obtained and stored either in the packaging solution in which they are usually sold (control) or the control packaging solution with the addition of 1% w/v poly(2-ethyl-2-oxazoline) (as described above) and 0.5% w/v Pemulen PR-2 (test).

Pairs of lenses were assessed in a random order, and test and control lenses were randomized between hands. The test and control lenses were assessed simultaneously in each hand by rubbing the lens between the thumb and index finger. Subjects (n=7) washed their hands before, after, and between each lens pair to prevent contamination. Subjects were asked to rate which lens was more "smooth and silky to the touch" and more "lubricious". In addition, subjects were asked if they had a preference between the two lenses.

All of the test lenses were rated as being more smooth and silky to the touch and more lubricious compared to the respective control. The test lenses were generally preferred to the control lenses, as they felt smoother, more slippery and less sticky after rubbing. The results indicate that the addition of polyoxazoline and Pemulen TR-2 to a contact lens packaging solution can improve the tactile feel of silicone hydrogel contact lenses of different formulations (e.g. somofilcon A, comfilcon A, and stenfilcon A) as well as non-silicone hydrogel contact lenses (e.g. omalfilcon A).

Example 4

Contact lenses made from somofilcon A were packaged and autoclaved in phosphate buffered saline with either 0.02 wt. % poloxamer 407 added (control lenses) or 0.02 wt. % poloxamer 407, 0.05 wt % Pemulen TR2, and 1.0 wt % poly(2-ethyl-2-oxazoline) (test lenses). The contact angle of lenses straight out of the package (unrinsed lenses) or after a PBS rinse (rinsed lenses) was measured by the sessile drop method using a drop shape analysis system (KRUSS DSA 100). For unrinsed lens measurements, a lens was removed from its package with tweezers and gently shaken to remove excess packaging solution. The front surface of the lens was gently blotted with lens paper and the back surface was positioned on top of a male mold. For rinsed lens measurements, a lens was removed from its package and placed in a hydration well with 4 mL PBS for 3 seconds then removed with tweezers, blotted and mounted on a male mold as described above for unrinsed lenses. Each mold with lens was placed into a DSA 100 chamber with the needle positioned as close as possible above the center of the lens. A droplet of PBS was dispensed from the needle and lowered further until the droplet touched the lens surface and the needle was quickly raised. Measurements were taken 9 times every 1 second. For each lens, the values for the 5, 7, and 9 second measurements were averaged and taken as the contact angle for the lens. All measurements were taken within 30 seconds of blotting. The results, in Table 5, show that the contact angles of the test and control lenses are within 5% of each other when removed from its packaging. After a PBS rinse the contact angle of the control lens increased by 74% and the contact angle of the test lens increased by 27%, suggesting that the packaging solution of the test lens has a stronger affinity to the contact lens material than the control lens and remains adhered to the lens even after rinsing.

TABLE 5

| Lens | Control AVG | Control STDEV | Test AVG | Test STDEV |
|---|---|---|---|---|
| Unrinsed | 23.10 | 1.68 | 22.32 | 0.92 |
| Rinsed | 40.25 | 0.37 | 28.29 | 0.29 |

The present invention includes the following aspects/embodiments/features in any order and/or in any combination:

1. The present invention relates, in part, to an unworn sterile contact lens immersed in a packaging solution and sealed in a container, wherein the packaging solution has a viscosity of 2.0 to 8.0 cP and comprises a poly(2-alkyl-2-oxazoline) and an acrylates/C10-30 alkyl acrylate crosspolymer.

2. The contact lens or method or other embodiment of any preceding or following embodiment/feature/aspect, wherein the poly(2-alkyl-oxazoline) is selected from poly(2-methyl-2-oxazoline), poly(2-ethyl-2-oxazoline), poly(2-n-propyl-2-oxazoline), poly(2-isopropyl-2-oxazoline), poly(2-cyclopropyl-2-oxazoline), poly(2-sec-butyl-2-oxazoline), and combinations thereof.

3. The contact lens or method or other embodiment of any preceding or following embodiment/feature/aspect, wherein the acrylates/C10-30 alkyl acrylate crosspolymer comprises a copolymer of acrylic acid and C10-C30 alkyl acrylates crosslinked with allyl pentaerythritol.

4. The contact lens or method or other embodiment of any preceding or following embodiment/feature/aspect, wherein the packaging solution comprises from about 0.1 wt. % to about 2.0 wt. % of the poly(2-alkyl-2-oxazoline).

5. The contact lens or method or other embodiment of any preceding or following embodiment/feature/aspect, wherein the packaging solution comprises from about 0.01 wt. % to about 0.5 wt. % of the acrylates/C10-30 alkyl acrylate crosspolymer.

6. The contact lens or method or other embodiment of any preceding or following embodiment/feature/aspect, wherein the packaging solution has a viscosity of 2.5 cP to 7.5 cP.

7. The contact lens or method or other embodiment of any preceding or following embodiment/feature/aspect, wherein said viscosity of the packaging solution is at least 1.0 cP higher than both of (1) a first control packaging solution that lacks the poly(2-alkyl-2-oxazoline) but is otherwise identical to the packaging solution, and (2) a second control packaging solution that lacks the acrylates/C10-30 alkyl acrylate crosspolymer but is otherwise identical to the packaging solution.

8. The contact lens or method or other embodiment of any preceding or following embodiment/feature/aspect, wherein said viscosity of the packaging solution is at least 2 cP higher than both the first and second control packaging solutions.

9. The contact lens or method or other embodiment of any preceding or following embodiment/feature/aspect, wherein the packaging solution has an average % light transmission (% T) across 400 nm to 600 nm of at least 98%.

10. The contact lens or method or other embodiment of any preceding or following embodiment/feature/aspect, wherein the packaging solution has an average % T across 400 nm to 600 nm that is at least 1.0% greater than a control packaging solution that lacks the poly(2-alkyl-2-oxazoline) but is otherwise identical.

11. The contact lens or method or other embodiment of any preceding or following embodiment/feature/aspect, wherein when removed from the container has a sessile drop contact angle that is at least 25% lower than a control lens packaged in a packaging solution that lacks the poly(2-alkyl-2-oxazoline) and acrylates/C10-30 alkyl acrylate crosspolymer but is otherwise identical.

12. The contact lens or method or other embodiment of any preceding or following embodiment/feature/aspect, that has less than a 50% increase in sessile drop contact angle after a PBS rinse.

13. The contact lens or method or other embodiment of any preceding or following embodiment/feature/aspect, comprising a silicone hydrogel polymeric lens body.

14. The contact lens or method or other embodiment of any preceding or following embodiment/feature/aspect, comprising a polymeric lens body that is the reaction product of a polymerizable composition comprising from 25 wt. % to 55 wt. % of a siloxane monomer or a combination of siloxane monomers, from 30 wt. % to 55 wt. % of a vinyl monomer selected from NVP, VMA, or combinations thereof, and optionally from about 1 wt. % to about 20 wt. % of a monomer selected from N,N-dimethylacrylamide (DMA), 2-hydroxyethyl methacrylate (HEMA), ethoxyethyl methacrylamide (EOEMA), or ethylene glycol methyl ether methacrylate (EGMA), or any combination thereof, and optionally from about 1 wt. % to about 20 wt. % of a monomer selected from methyl methacrylate (MMA), isobornyl methacrylate (IBM), or 2-hydroxybutyl methacrylate (HOB) or any combination thereof.

15. The contact lens or method or other embodiment of any preceding or following embodiment/feature/aspect, wherein the sealed container comprises (i) a thermoplastic base member comprising a bowl that defines a blister cavity dimensioned to accommodate the contact lens and packaging solution and a flange projecting away from the blister cavity, and (ii) a cover comprising a removable foil attached to the flange region to provide a liquid tight seal.

16. The present invention also relates to a method of manufacturing a packaged contact lens comprising: (a) placing a contact lens and an ophthalmically-acceptable packaging solution in a container, (b) sealing the container, and (c) heat sterilizing the sealed container, wherein the packaging solution has a viscosity of 2.0 to 8.0 cP and comprises a poly(2-alkyl-oxazoline) and an acrylates/C10-30 alkyl acrylate crosspolymer.

The present invention can include any combination of these various features or embodiments above and/or below as set forth in sentences and/or paragraphs. Any combination of disclosed features herein is considered part of the present invention and no limitation is intended with respect to combinable features.

The disclosure herein refers to certain illustrated examples, it is to be understood that these examples are presented by way of example and not by way of limitation. The intent of the foregoing detailed description, although discussing exemplary examples, is to be construed to cover all modifications, alternatives, and equivalents of the examples as may fall within the spirit and scope of the invention as defined by the additional disclosure.

References herein to "an example" or "a specific example" or "an aspect" or "an embodiment" or similar phrase, are intended to introduce a feature or features of the contact lens or components thereof, the sealed contact lens package or components thereof, or method of manufacturing the contact lens (depending on context) that can be combined with any combination of previously-described or subsequently-described examples, aspects, embodiments (i.e. features), unless a particular combination of features is mutually exclusive, or if context indicates otherwise. Further, as used in this specification, the singular forms "a," "an," and "the" include plural referents (e.g., at least one or more) unless the context clearly dictates otherwise. Thus, for example, reference to a "contact lens" includes a single lens as well as two or more of the same or different lenses.

The entire contents of all cited references in this disclosure, to the extent that they are not inconsistent with the present disclosure, are incorporated herein by reference.

The present invention can include any combination of the various features or embodiments described above and/or in the claims below as set forth in sentences and/or paragraphs. Any combination of disclosed features herein is considered part of the present invention and no limitation is intended with respect to combinable features.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. An unworn sterile contact lens immersed in a packaging solution and sealed in a container, wherein the packaging solution has a viscosity of 2.0 to 8.0 cP and comprises a poly(2-alkyl-2-oxazoline) and an acrylates/C10-30 alkyl acrylate crosspolymer.

2. The contact lens of claim 1, wherein the poly(2-alkyl-oxazoline) is selected from poly(2-methyl-2-oxazoline), poly(2-ethyl-2-oxazoline), poly(2-n-propyl-2-oxazoline), poly(2-isopropyl-2-oxazoline), poly(2-cyclopropyl-2-oxazoline), poly(2-sec-butyl-2-oxazoline), and combinations thereof.

3. The contact lens of claim 1, wherein the acrylates/C10-30 alkyl acrylate crosspolymer comprises a copolymer of acrylic acid and C10-C30 alkyl acrylates crosslinked with allyl pentaerythritol.

4. The contact lens of claim 1, wherein the packaging solution comprises from about 0.1 wt. % to about 2.0 wt. % of the poly(2-alkyl-2-oxazoline).

5. The contact lens of claim 1, wherein the packaging solution comprises from about 0.01 wt. % to about 0.5 wt. % of the acrylates/C10-30 alkyl acrylate crosspolymer.

6. The contact lens of claim 1, wherein the packaging solution has a viscosity of 2.5 cP to 7.5 cP.

7. The contact lens of claim 1, wherein said viscosity of the packaging solution is at least 1.0 cP higher than both of (1) a first control packaging solution that lacks the poly(2-alkyl-2-oxazoline) but is otherwise identical to the packaging solution, and (2) a second control packaging solution that lacks the acrylates/C10-30 alkyl acrylate crosspolymer but is otherwise identical to the packaging solution.

8. The contact lens of claim 7, wherein said viscosity of the packaging solution is at least 2 cP higher than both the first and second control packaging solutions.

9. The contact lens of claim 1, wherein the packaging solution has an average % light transmission (% T) across 400 nm to 600 nm of at least 98%.

10. The contact lens of claim 1, wherein the packaging solution has an average % T across 400 nm to 600 nm that is at least 1.0% greater than a control packaging solution that lacks the poly(2-alkyl-2-oxazoline) but is otherwise identical.

11. The contact lens of claim 1 that when removed from the container has a sessile drop contact angle that is at least 25% lower than a control lens packaged in a packaging solution that lacks the poly(2-alkyl-2-oxazoline) and acrylates/C10-30 alkyl acrylate crosspolymer but is otherwise identical.

12. The contact lens of claim 11 that has less than a 50% increase in sessile drop contact angle after a PBS rinse.

13. The contact lens of claim 1 comprising a silicone hydrogel polymeric lens body.

14. The contact lens of claim 1 comprising a polymeric lens body that is the reaction product of a polymerizable composition comprising from 25 wt. % to 55 wt. % of a siloxane monomer or a combination of siloxane monomers, from 30 wt. % to 55 wt. % of a vinyl monomer selected from NVP, VMA, or combinations thereof, and optionally from about 1 wt. % to about 20 wt. % of a monomer selected from N,N-dimethylacrylamide (DMA), 2-hydroxyethyl methacrylate (HEMA), ethoxyethyl methacrylamide (EOEMA), or ethylene glycol methyl ether methacrylate (EGMA), or any combination thereof, and optionally from about 1 wt. % to about 20 wt. % of a monomer selected from methyl methacrylate (MMA), isobornyl methacrylate (IBM), or 2-hydroxybutyl methacrylate (HOB) or any combination thereof.

15. The contact lens of claim 1 wherein the sealed container comprises (i) a thermoplastic base member comprising a bowl that defines a blister cavity dimensioned to accommodate the contact lens and packaging solution and a flange projecting away from the blister cavity, and (ii) a cover comprising a removable foil attached to the flange region to provide a liquid tight seal.

16. A method of manufacturing a packaged contact lens comprising: (a) placing a contact lens and an ophthalmically-acceptable packaging solution in a container, (b) sealing the container, and (c) heat sterilizing the sealed container, wherein the packaging solution has a viscosity of 2.0 to 8.0 cP and comprises a poly(2-alkyl-oxazoline) and an acrylates/C10-30 alkyl acrylate crosspolymer.

* * * * *